United States Patent [19]
Ockels

[11] Patent Number: 5,785,481
[45] Date of Patent: Jul. 28, 1998

[54] TRAILER FOR DISPENSING BULK SEED INTO PLANTING EQUIPMENT

[75] Inventor: Gary C. Ockels, Milton, Del.

[73] Assignee: Ockels Equipment Co., L.L.C., Milton, Del.

[21] Appl. No.: 629,070

[22] Filed: Apr. 8, 1996

[51] Int. Cl.⁶ ............................................ B65G 67/24
[52] U.S. Cl. ........................ 414/523; 222/1; 414/526; 414/503
[58] Field of Search ........................... 222/1; 414/526, 414/523, 502, 503, 504, 505

[56] References Cited

U.S. PATENT DOCUMENTS

| | | |
|---|---|---|
| 2,490,241 | 12/1949 | Smith et al. .................... 414/526 X |
| 2,601,608 | 6/1952 | Hansen . |
| 2,613,004 | 10/1952 | Kane ............................... 414/505 |
| 3,074,599 | 1/1963 | Fox . |
| 3,197,075 | 7/1965 | Hansen . |
| 3,265,253 | 8/1966 | Niewold . |
| 3,439,819 | 4/1969 | Quanbeck . |
| 3,638,816 | 2/1972 | Mann .............................. 414/523 X |
| 3,659,747 | 5/1972 | Teichgraeber . |
| 3,730,395 | 5/1973 | Gallogly et al. . |
| 3,844,433 | 10/1974 | Laajala ............................ 414/523 X |
| 4,411,581 | 10/1983 | Niewold . |
| 4,419,037 | 12/1983 | Niewold . |
| 4,503,803 | 3/1985 | Barnes . |
| 4,669,945 | 6/1987 | Pollard et al. .................... 414/503 |
| 4,742,938 | 5/1988 | Niewold . |
| 5,108,038 | 4/1992 | Palladino et al. . |
| 5,257,893 | 11/1993 | Sevits ............................. 414/526 X |
| 5,468,113 | 11/1995 | Davis .............................. 414/523 |

FOREIGN PATENT DOCUMENTS 969901  7/1958  Germany ........................ 414/526

Primary Examiner—Frank E. Werner
Attorney, Agent, or Firm—Myers, Liniak & Berenato

[57] ABSTRACT

A trailer for dispensing different types of bulk material such as seed into planting equipment is disclosed, the trailer including a pair of substantially planar platforms with an elongated conveying bin disposed below and between the platforms. Seed from one or more of the bulk bags falls into the bin and is conveyed by way of an auger forward to a hopper located at the ends of the platforms. From the hopper, the seed is dispensed into planting equipment by way of a pivotally mounted elevated auger which swings in about a 180° arc so as to dispense seed on both sides of the trailer. The elevated auger and corresponding tube are mounted to the trailer by way of a hanging pivot member which enables the auger to pivot between a dispensing position in which the intake end of the auger is located in the hopper and a storage position where the auger tube extends rearwardly above the platforms.

7 Claims, 5 Drawing Sheets

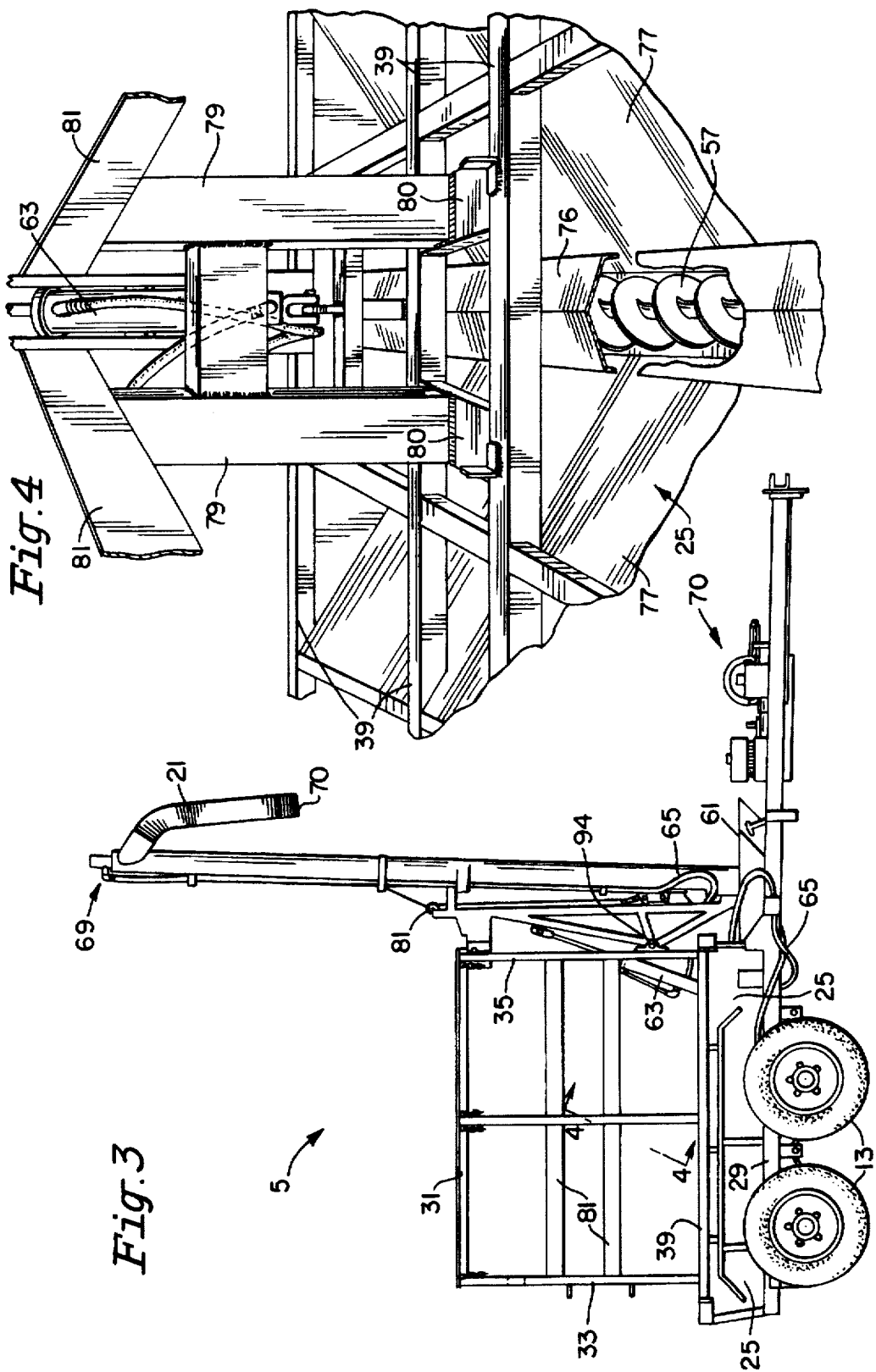

TRAILER FOR DISPENSING BULK SEED INTO PLANTING EQUIPMENT

This invention relates to a trailer for dispensing bulk material such as seed into planting equipment. More particularly, this invention relates to a seed dispensing trailer to be towed by a powered vehicle, the trailer for dispensing a plurality of different types of seed by way of a pivotally mounted auger tube.

BACKGROUND OF THE INVENTION

Wheeled vehicles for dispensing seed are old and well-known in the art. Such vehicles typically include auger tubes for pumping feed, fertilizer, seed, grain, and other types of free flowing particulate or granular materials. Examples of prior art in this field include U.S. Pat. Nos. 3,197,075; 4,419,037; 4,503,803; and 4,742,938.

U.S. Pat. No. 4,742,938 discloses a wheeled vehicle for supporting a dispensing auger tube adjacent a hopper. A gravity box is used for permitting free flowing material, such as grain, to flow from the gravity box into the hopper. The auger tube conveys the material from the hopper to a dispensing location at the output end of the auger tube. The hopper and auger tube are capable of being pivoted in a vertical plane perpendicular to the gravity box.

Unfortunately, the dispensing system of the '938 patent suffers from at least the following problems. Firstly, the system is only capable of dispensing one type of material at a time (i.e. the type of material in the gravity box). Once the bulk material in the box has been dispensed, the wheeled vehicle must be taken back to a bulk location and be refilled if another type of material is to be dispensed. Secondly, while the dispensing auger tube of the '938 system is pivotal about an arc, there is no convenient place for "storing" the auger tube when the system is not in use and the vehicle is being transported. In other words, during transport of the vehicle to and from bulk dispensing locations, the dispensing auger tube is in an inconvenient position which renders it susceptible to damage. Thirdly, the pivotal attachment system connecting the auger tube to the vehicle is less than desirable.

U.S. Pat. No. 3,197,075 discloses a bulk material handling system on a vehicle which has a material blending auger unit and a variable volume auger for varying the ratio between materials to be blended or mixed. Because of the two compartments or bins defined in the body of the system, two different materials may be blended and dispensed together by way of a tubular conveyor pivotally mounted on the rear wall of the body. Unfortunately, the system of the '075 patent suffers from the same problems as discussed above with respect to the '938 system. The dispensing conveyor member, while pivotally mounted, does not have a convenient position for storage during transport of the vehicle. Also, the system of the '075 patent cannot dispense material from the rear bin without simultaneously dispensing material from the front bin. In other words, a problem is presented in that the material in the rear bin cannot be dispensed by itself. This eliminates the possibility of the system of the '075 patent of being able to separately dispense different types of materials at different times.

U.S. Pat. No. 4,503,803 discloses a seed dispensing system mounted on the rear of a pickup truck for dispensing seed into planting equipment in the field. The seed treating and conveying system of the '803 patent includes an elongated auger unit having a relatively small seed hopper on the inlet end thereof, the inlet end being mounted for both pivot movement about a generally upright pivot axis and longitudinal sliding movement along an elongated slide track. The slide track is supported in spaced relation above the truck bed on which it is mounted so as to leave substantially the entire truck bed open for carrying bags of seed. The combined pivotal and slide support for the inlet end of the auger unit enables the unit to be readily repositioned for filling many spaced apart planter devices without changing the position of the truck. Furthermore, the position of the discharge auger is readily adjusted by the individual pouring seed into the hopper thereby allowing a convenient one-man operation. According to another embodiment of the '803 disclosure, seed from a large hopper is conveyed to the dispensing auger unit by a short stationary inner auger unit, both augers being hydraulically driven.

Unfortunately, the system of the '803 patent may only be used to dispense the type of seed found in the hopper. If it is desired to dispense another type of seed, the hopper must be emptied and refilled with the other type of seed. Furthermore, because the system is mounted on the rear of a pickup truck, the overall system is bulky, and rather inconvenient for dispensing large amounts of seed. Also, according to the latter '803 embodiment, there is little room for seed bags in the truck bed, and it is difficult to get the seed from the bag into the large hopper. As with the previous examples, the pivot attachment configuration of the '803 patent is less than desirable.

U.S. Pat. No. 4,419,037 discloses a system including an auger tube for pumping feed, fertilizer, grain, and other free flowing particulate or granular materials, the tube being mounted on the rear of a truck adjacent a hopper which contains the material to be dispensed. The auger tube, by virtue of the pivotal and swivel mountings, is pivotal in a 90° arc in a plane perpendicular to the axis of the pivotal movement and is swivalable in a 180° arc in a plane which is parallel to the axis of the pivotal movement. The tube folds up when in non-use. Unfortunately, the system of the '037 patent also suffers from many of the problems discussed above with respect to other prior art in this field.

It is apparent from the above that there exists a need in the art for a trailer for dispensing bulk material such as seed and the like into planting equipment, the trailer system being able to 1) dispense different types of seed without returning to a bulk dispensing location; 2) store the dispensing auger tube in a convenient storage location when in non-use so that, during transport of the trailer, the tube is not susceptible to damage; 3) efficiently mount the dispensing tube (e.g. auger tube) in an output hopper such that it may dispense seed on both sides of the trailer and be pivoted to and from its storage position; and 4) provide room for a large number of material (e.g. seed) bags and means for easily getting the material from the bags to a dispensing hopper.

SUMMARY OF THE INVENTION

Generally speaking, this invention fulfills the above-described needs in the art by providing a seed dispensing trailer for transporting bulk material such as seed, and dispensing same into planting equipment, the dispensing trailer comprising:

- at least one substantially planar platform for supporting a plurality of different bulk material bags;
- an elongated bin disposed beneath the platform so that gravity causes material from the bags on the platform to fall into the elongated bin;
- an elongated auger in the elongated bin for conveying the material (e.g. seed) in the elongated bin to a hopper located at an end of the platform; and a pivotal elevated auger for conveying the material upward from the hopper through an auger tube and thereafter into the planting equipment.

In certain preferred embodiments of this invention, the elevated auger is pivotally mounted to the trailer by way of a hanging pivot member which permits the elevated auger to pivot and dispense seed on both sides of the trailer, the hanging pivot member maintaining the lower or intake end of the elongated auger substantially in the center of the hopper while pivoting from one side of the trailer to the other, and permitting the dispensing auger to pivot to and from a storage position where the auger extends rearwardly over the platforms.

This invention further fulfills the above-described needs in the art by providing a method of dispensing first and second different types of seed from bulk bags using a trailer, the method comprising the steps of:

providing a trailer having first and second spaced apart platforms and an elongated conveyor bin below the platforms;

placing a first bag of the first seed on the first platform and a second bag of the different second seed on the second platform;

opening the first bag and allowing the first seed to fall into the elongated conveyor bin;

conveying the first seed through the bin to a hopper;

augering the first seed upward from the hopper through an elevated auger tube so as to dispense the first seed into planting equipment;

after dispensing of the first seed is completed allowing the second seed from the second bag to fall into the elongated conveyor bin;

augering the second seed through the bin to the hopper; and dispensing the second seed from the hopper to planting equipment using the elevated auger tube.

This invention still further fulfills the above-described needs in the art by providing a wheeled vehicle for dispensing seed or other particulate or granular material, such as feed, fertilizer, grain, and the like, the wheeled vehicle comprising:

means for conveying or moving seed into a hopper;

an elevated auger tube for dispensing the seed positioned with its intake end in the hopper and its dispensing or output end remote from the hopper;

pivotally mounting the elevated auger tube to the vehicle via a hanging pivot member so that the tube can pivot and dispense seed on both sides of the vehicle; and wherein the hanging pivot member includes pivot means for moving the tube from a dispensing position where the intake end of the tube is in the hopper to a storage position where the intake end of the tube is removed from the hopper.

This invention will now be described with respect to certain embodiments thereof, accompanied by certain illustrations, wherein:

IN THE DRAWINGS

FIG. 3 is a side elevational view of the trailer of FIGS. 1-2, wherein no seed bags are mounted on either of the platforms and the dispensing auger tube is in a position where it extends vertically upward relative to the ground.

FIG. 4 is a perspective view of the seed dispensing trailer of FIGS. 1-3, this view taken along the sectional line illustrated in FIG. 3 so that FIG. 4 illustrates the elongated bin and auger therein disposed beneath and between the platforms.

DETAILED DESCRIPTION OF CERTAIN EMBODIMENTS OF THIS INVENTION

Figure 1:
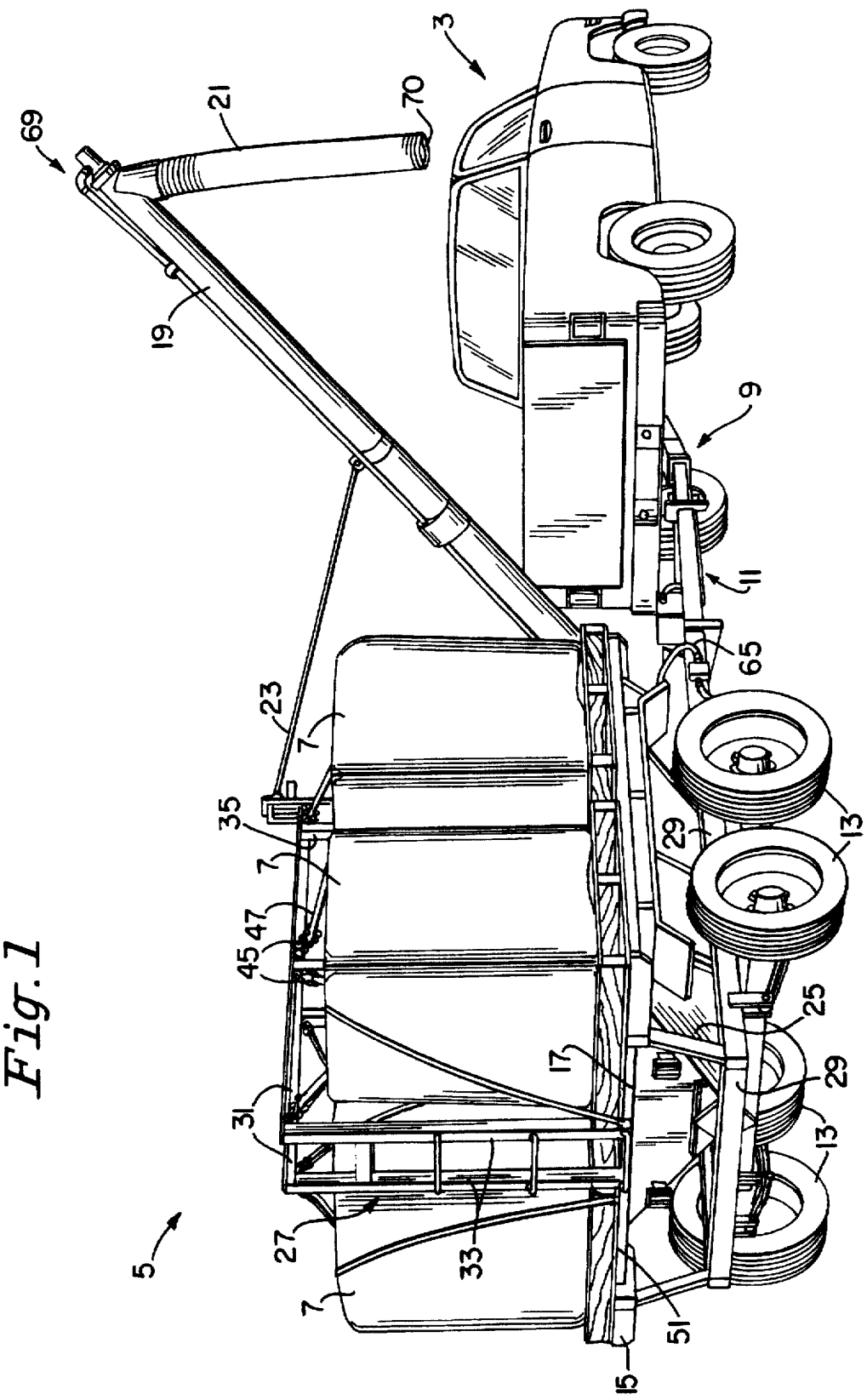
FIG. 1 is a perspective view illustrating the seed dispensing trailer according to an embodiment of this invention attached to the rear of a pickup truck, the truck adapted for towing the trailer.

Referring now more particularly to the accompanying drawings in which like reference numerals indicate like parts throughout the several views.

FIG. 1 is a perspective view illustrating pickup truck 3 towing trailer 5 for dispensing bulk seed or other free flowing material according to an embodiment of this invention. As shown in this embodiment, four different seed bags 7 are mounted on trailer 5, this enabling the system to dispense different types of seed without having to trek back to a bulk loading area where additional bulk seed is located. Pickup truck 3 includes towing hitch 9 to which is attached elongated section 11 of trailer 5 thereby enabling the powered vehicle to tow the trailer from location to location in the field. Trailer 5 includes wheels 13, first substantially planar platform 15, second substantially planar platform 17 (each platform supporting a pair of bags 7), elevated dispensing auger tube 19, flexible tubing spout 21 for permitting material to be dispensed from the auger tube, elongated tube support member 23 (e.g. cable), elongated bin 25 for permitting seed or other material which falls from bag(s) 7 to be conveyed to the forward hopper, ladder 27 for permitting users to climb up and on top of the trailer, frame 29, a hydraulic system for powering the pair of augers, horizontally extending support members or bars 31, rear vertically extending members or bars 33, and similar forward vertically extending members or bars 35. Platforms 15 and 17 are provided so that the material from the bulk bags 7 can flow into bin 25 simply by opening or cutting the bag(s) and allowing gravity to move the material downward into the bin 25 (i.e. bag(s) need not be moved).

Figure 2:
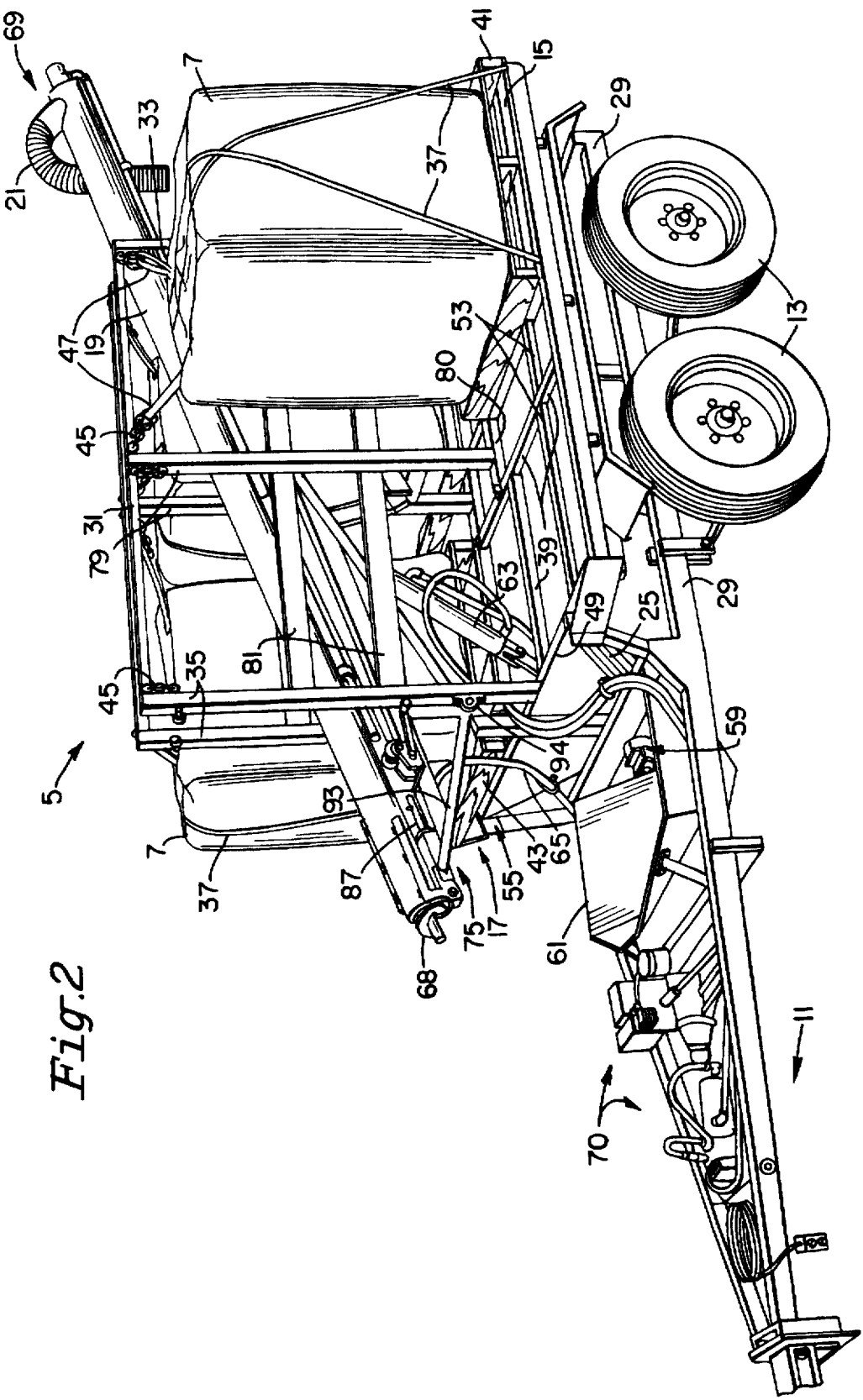
FIG. 2 is a perspective view of the seed dispensing trailer of FIG. 1, wherein only one bulk seed bag is mounted on one of the platforms and the dispensing auger tube is in its storage position.

FIG. 2 is a perspective view of trailer 5 where only three bulk material bags 7 (holding seed or the like) are strapped 37 thereon. As illustrated, platform 15 for supporting bag 7 includes a plurality of interconnected and structurally affixed supporting bars 39 on top of which pallet 41 and bag 7 are secured via strap(s) 37 and chain(s) 45. Platform 17 is substantially coplanar with platform 15 but is spaced therefrom as vertical support bars 33, 35, and 79 are disposed between the two platforms 15 and 17. In a manner similar to platform 15, platform 17 includes a plurality of interconnected and affixed supporting bars 39 on top of which pallet(s) 43 are secured by way of straps 37. Bags 7 may also, or additionally, be secured to trailer 5 and horizontal bars 31 by way of chain links 45 to which bag supports or loops 47 are secured.

Elongated conveying bin 25 is open at the top and is disposed beneath and at least partially between platforms 15 and 17. Bin 25 extends from the front 49 to approximately the rear 51 of the platforms, and extends laterally from approximately bar 53 of platform 15 below bars 31 and over to 55. As a result of this design, seed or other bulk material from bags 7 is permitted to flow (when bags 7 are opened) downward due to gravity through the gap(s) between bars 39 of the platforms and into bin 25. Once in bin 25, hydraulically powered elongated auger 57 (see FIG. 4) disposed at the bottom of bin 25 conveys the seed or other material forward where it is dumped at 59 into hopper 61. The material is forwarded to the output end of auger 57 and through the hole in the hopper wall into the hopper. Elongated auger 57 and elevated auger 68 disposed in tube 19 are driven by hydraulic motors, which along with hydraulic cylinder 63, receive power from combination gasoline engine/hydraulic pump 70. According to certain alternative embodiments, the hydraulics can be operated by connection to the hydraulic system of a tractor or the pickup truck used to pull trailer 5 in a known manner.

Once the seed or other bulk material is in hopper 61, it is dispensed by way of auger or dispensing tube 19 and flexible spout 21 into planting equipment or the like. The material (e.g. seed) in hopper 61 is conveyed upwardly through tube 19 by way of elongated auger 68 disposed within the tube. When the material reaches the top 69 of auger tube 19, it flows into flexible spout 21 and is dispensed out of end 70 thereof. Auger tube 19 is mounted to trailer 5 by way of hanging pivot member 75 which permits auger tube 19 to swing approximately 180° from one side of the trailer to the other thereby enabling the system to dispense material on both sides of trailer 5. Additionally, hanging pivot member 75 permits dispensing tube 19 to be moved between a dispensing position (see FIGS. 1, 5, and 6) and a storage position (see FIG. 2).

FIG. 3 is a side elevational view of seed dispensing trailer 5 when no bags 7 are mounted thereon. As illustrated in FIG. 3, elevated auger tube 19 is arranged in its vertically upright position, this upright position being between the storage position (FIG. 2) and the dispensing position (FIG. 1).

FIG. 4 is an enlarged view taken along the section line shown in FIG. 3, FIG. 4 illustrating elongated auger 57 located at the bottom of bin 25 and arranged substantially parallel to the ground. Auger 57 conveys seed or the like within bin 25 forward toward and into hopper 61. According to certain embodiments, cover 76 may be provided over top of auger 57 with the seed making its way into the auger area from the sides. As shown in FIG. 4, elongated bin 25 includes a pair of sloped sidewalls 77 which angle downward toward auger 57. The angulation of sidewalls 77 causes seed or the like within the bin, because by gravity, to flow downward to the auger area and thereafter be conveyed by the auger to hopper 61.

FIG. 4 also illustrates in a close-up manner support members or bars 39 which make-up first and second platforms 15 and 17. By opening (e.g. cutting) one of bags 7 above bin 25, the seed or other material is caused by gravity to fall downward through the holes defined by support members 39 and into bin 25 from which the seed in is conveyed to hopper 61. FIG. 4 further illustrates vertically arranged support members 79 supported by cross-members 80, with side rails 81 being affixed to vertical bars 79.

Figure 5:
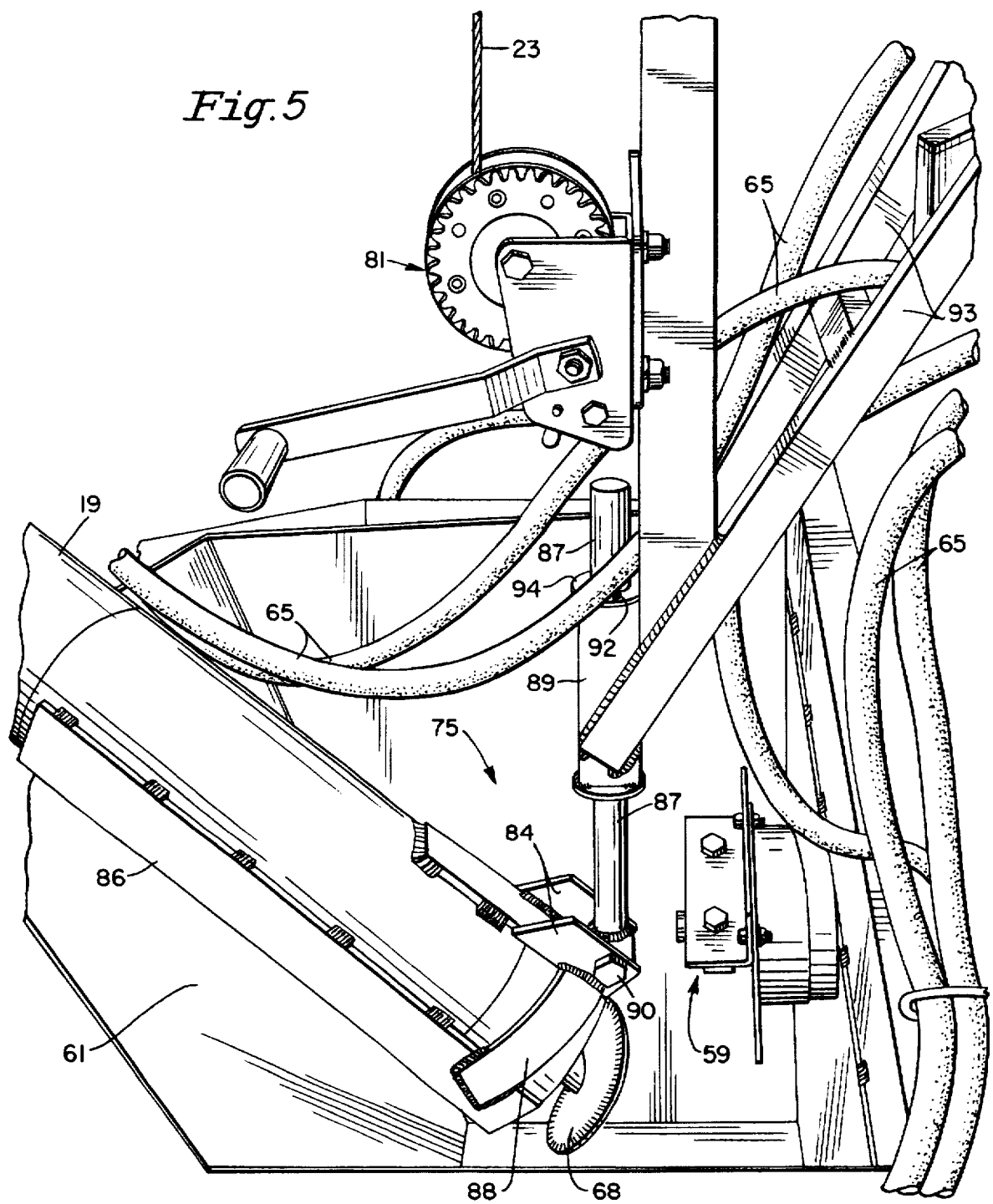
FIG. 5 is a close-up perspective view of the hanging pivot member, the hopper, the winch, and intake end of the auger tube of the seed dispensing trailer of FIGS. 1-4.

FIG. 5 is a close-up view of the intake end of elevated auger tube 19 pivotally attached to the frame of the trailer by way of hanging pivot member 75, with member 75 maintaining the centering of the intake end of auger tube 19 within hopper 61 while permitting vertical discharge of seed or the like through the auger tube. Winch 81 and supporting cable 23 attached thereto are provided on the trailer adjacent one of bars 35 for the purpose of lowering auger tube 19 so that end 70 of spout 21 is positionable at a proper height relative to the planter, the wench and cable 23 also being used to raise tube 19 from the planter height when dispensing is complete.

Figure 6:
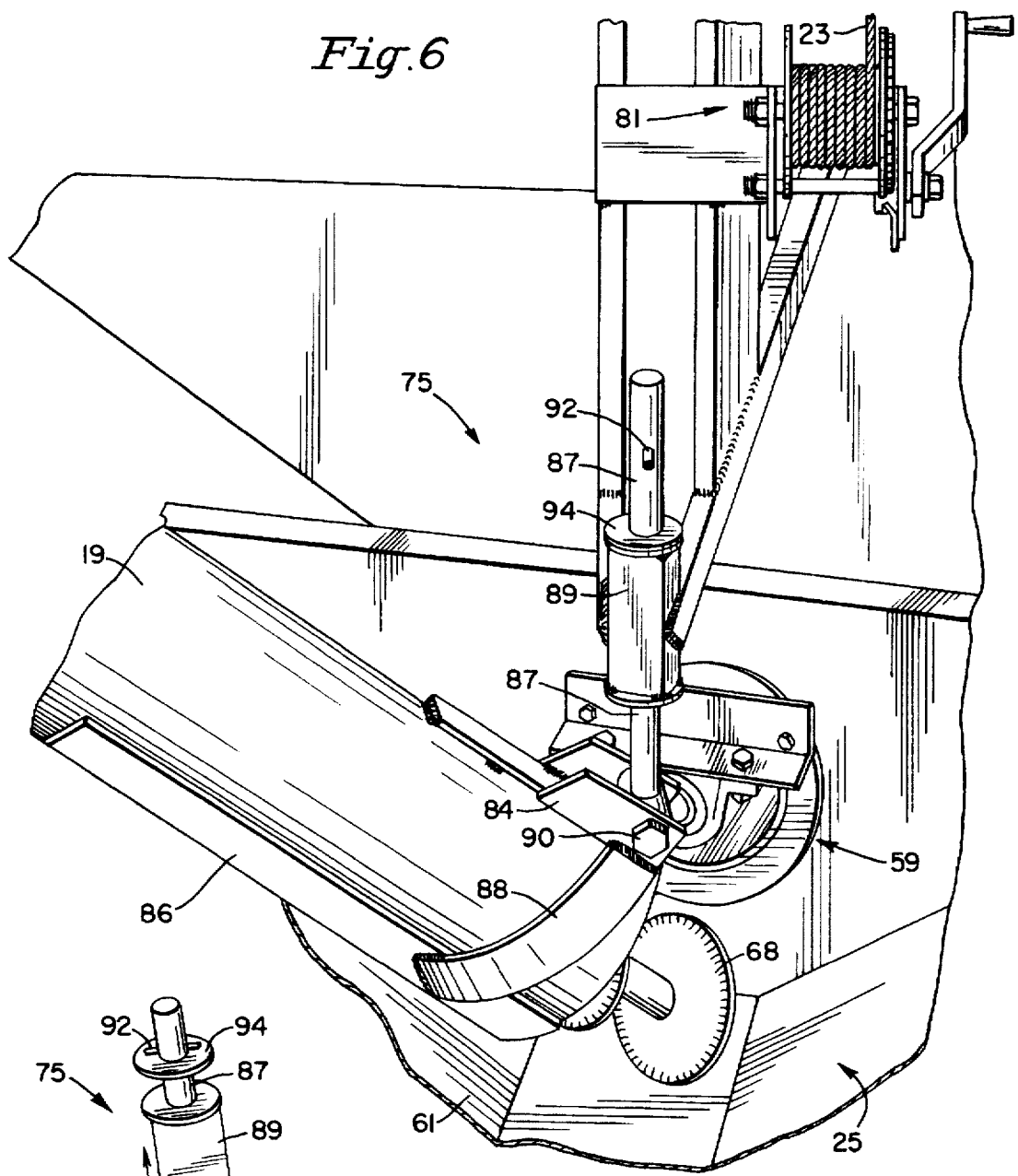
FIG. 6 is a perspective close-up view of the hanging pivot member and intake end of the elevated auger tube of FIGS. 1-5 taken from the position of a viewer in the back of the FIG. 1 pickup truck.
Figure 7:
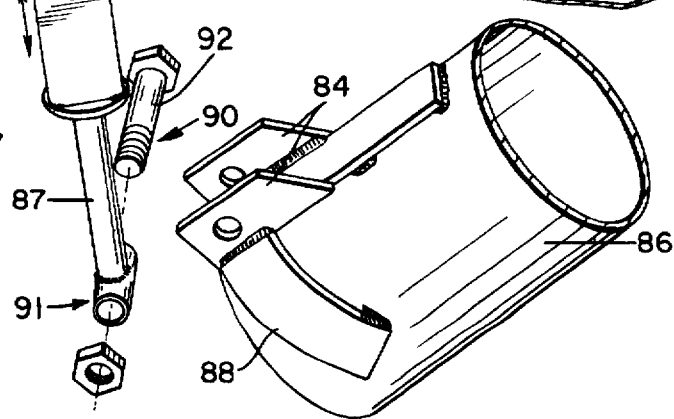
FIG. 7 illustrates how the hanging pivot member, shown in detail in FIGS. 5 and 6, is put together according to another embodiment of this invention.

FIG. 6 is a close-up view of hanging pivot member 75, the intake end of auger tube 19, auger 68, hopper 61, and bin discharge area 59 where a material is conveyed from bin 25 into hopper 61. FIG. 7 illustrates how hanging pivot member 75 is put together.

Referring now to FIGS. 5–7 and hanging pivot 75, the hanging pivot member includes curved support member 86 for supporting the intake end of tube 19, elongated rotatable shaft 87, a pair of arms 88 attached to support member 86, sidewalls 84 for receiving bolt 92, and housing 89 affixed to the trailer frame for rotatably receiving therein shaft 87. Shaft 87 is permitted to rotate or pivot within housing 89 thereby allowing arms 88, supporting member 86, and dispensing tube 19 to pivot along with the shaft approximately 180°. Actuation of winch 81 and cable 23 causes auger tube 19, support 86, and arms 88 to pivot relative to shaft 87 about pivot point 90. Thus, the use of the winch 81 in combination with tube 19 pivoting about point 90 relative to a trailer permits spout end 70 to be moved into and out of a height appropriate for dispensing seed into the planting equipment. Accordingly, the elevated auger tube may be pivoted in two different dimensions by way of pivot point 90 and the pivot about shaft 87.

Pin 92 of member 75 extends through or is affixed to shaft 87, with pin 92 resting on top of collar 94 during operation so as to maintain horizontal rotation (see FIG. 5). In operation, of course, collar 94 rests on top of housing 89. Housing 89 is freely slidable along shaft 87 between pin 92 and pivot point 90. In operation, when tube 19 is in the dispensing position, shaft 87 and support 88 slide down until pin 92 comes to rest on top of collar 94 and/or housing 89.

When it is desirable to move auger tube 19 into the FIG. 2 storage position, the hydraulic system including cylinder 63 is utilized to cause arms 93 of hanging pivot member 75 to pivot about axis 94 (see FIGS. 2–3) thereby causing auger tube 19 (when winch 81 is wound tight) to pivot rearward so that its elongated body then extends between members 31 and over top of the platform area of the trailer. When numerous bags 7 are positioned on platforms 15 and 17, the auger tube 19 when in the storage position (FIG. 2) extends between the bags on the opposing platforms as a result of the positioning of vertical members 33, 35, and 79 as well as horizontal members 81 and 31.

A typical dispensing operation utilizing trailer 5 will now be described referencing all figures herein. Firstly, four 2,000 lb. bags 7 of seed or the like are loaded onto trailer 5 as shown in FIG. 1, with two bags 7 being loaded on each platform 15 and 17, respectively. Chains 45 located at the top of the bag support brackets are used to position and restrain bags 7. The trailer 5 is now ready for travel with auger tube 19 in the storage position (FIG. 2). Pickup truck 3 or any other type of powered vehicle such as a tractor is used to tow or push trailer 5 to an appropriate location near the planting equipment to be filled with the seed. It is noted that, because of the inventive design of trailer 5, each bag 7 may contain a different type of seed thereby enabling the system to dispense four different types of seed, one at a time, without having to return to the loading area.

In order to fill a typical planter, hanging pivot member 75 including arms 93 is raised from the FIG. 2 storage position to the FIG. 3 operating position by way of hydraulic cylinder 63. From the FIG. 3 position, auger tube 19 as well as spout end 70 are lowered to the planter height by way of winch 81 and support cable 23.

Once in this finalized dispensing position, seed is released from one or more of bags 7 so that it flows into bin 25 which is located under the seed bag pallets 41 and 43. Pallets 41 and 43 may or may not include apertures therein for allowing seed to fall therethrough. Once the seed is in bin 25, it is conveyed forward and into hopper 61 by way of auger 57. The seed is emptied into hopper 61 from bin 25 at 59.

After the seed reaches hopper 61, it is augered upward through tube 19 by elongated auger 68 which is disposed within the tube. When seed reaches the top 69 of tube 19, it flows downward due to gravity through flexible spout 21 and is discharged at the end 70 thereof into the planter. Elevated auger 19 may swing up to about 180° horizontally thereby allowing filling of the planter from either the left-hand or right-hand side of the trailer. The positioning and design of hanging pivot 75 maintains the centering of the intake end of the elevated auger while providing vertical discharge at all times.

By contrasting FIGS. 5–7, it can be seen that support 86 may include either an annular tube (FIG. 7) or a half-annular (or semi-circular) tube (FIGS. 5–6).

Augers 68 and 57 are run by hydraulic motors while, for example, a twenty-five foot cord and electric switches are used to control the augers by way of electric solenoid operated valves.

After dispensing of one type of seed from one bag 7 is complete, another bag 7 containing a different type of seed may be opened thereby allowing the different seed to be dispensed into a different part of the planter, for example. This arrangement, including the two bag wide approach, permits users to reduce the total length of the trailer and allows users to go to the field with four different seeds. The elevated auger hanging pivot member permits a great deal of flexibility in the positioning of the trailer in relation to the planting equipment during transfer of seed. Additionally, wired remote control enables the operator to start and stop either auger from the operator's position at the planter (not shown).

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A seed dispensing trailer for transporting bulk seed and capable of dispensing the seed into planting equipment from any point in an arc transcribed between one side of said trailer and the other side, the seed dispensing trailer comprising:

structural frame members defining a first and second side of said trailer connected to a wheeled suspension system extending between said first and said second side of said trailer;

at least one planar platform for supporting a plurality of bulk seed bags thereon, said platform being connected to said structural frame members;

a walled bin disposed beneath said platform and so located with respect to said platform as to allow seed from said bags on said platform to fall by gravity into said walled bin;

a first auger system located in said walled bin, said first auger system including a first auger capable of conveying said seed in said walled bin to a seed hopper located at one end of said trailer;

a pivotal second auger system located in seed engaging relationship with said seed hopper, said second auger system including a dispensing tube and a second auger located within said dispensing tube capable of dispensing seed from said hopper through said tube to said planting equipment;

said dispensing tube being comprised of an elongated tubular portion having an intake end locatable proximal said hopper and an exit end for dispensing seed therefrom; and a pivot system for pivotally connecting said second auger system to said trailer, so constructed as to permit said second auger system to be rotated in an arc transcribed between said first side of said trailer and said second side of said trailer thereby to enable said seed to be dispensed from any point along said arc.

2. A seed dispensing trailer according to claim 1 which further includes means for raising and lowering the spout of said pivotal second auger system.

3. A seed dispensing trailer according to claim 1 wherein said pivot system includes a housing connected to said structural frame members and a shaft rotatable in said arc and located within said housing, said shaft being attached to said second auger system thereby to permit said second auger system to be rotated in said arc.

4. A seed dispensing trailer according to claim 3 wherein said shaft is slidable in said housing and wherein said shaft has a longitudinal axis which extends in a generally vertical direction with respect to any surface upon which said trailer resides.

5. A seed dispensing trailer according to claim 4 wherein said pivot system further includes a pivot pin generally perpendicular to said shaft, and said pivot pin located proximal one end of said shaft pivotally connecting said shaft to said second auger system such that when said second auger system is pivoted about said pivot pin, said exit end of said dispensing tube is raised or lowered with respect to the surface upon which said trailer resides.

6. A seed dispensing trailer according to claim 5 wherein said structural frame members include a frame structure extending above said platform for retaining said second auger system in a storage position, and wherein said housing for said rotatable shaft is connected to said frame structure by at least one arm having a first end attached to said shaft housing and a second end attached to said frame structure extending above said platform, at least one of said ends of said arm being pivotally attached thereby to allow said second auger system to be pivotally rotated out of said seed engaging position with said hopper and into a storage position proximal said frame structure extending above said platform.

7. A seed dispensing trailer according to claim 6 wherein said trailer further includes a hydraulic system comprised of a hydraulic cylinder pivotally connected between said second auger system and said structural frame members for moving said second auger system between a seed dispensing position and said storage position.

* * * * *